UNITED STATES PATENT OFFICE.

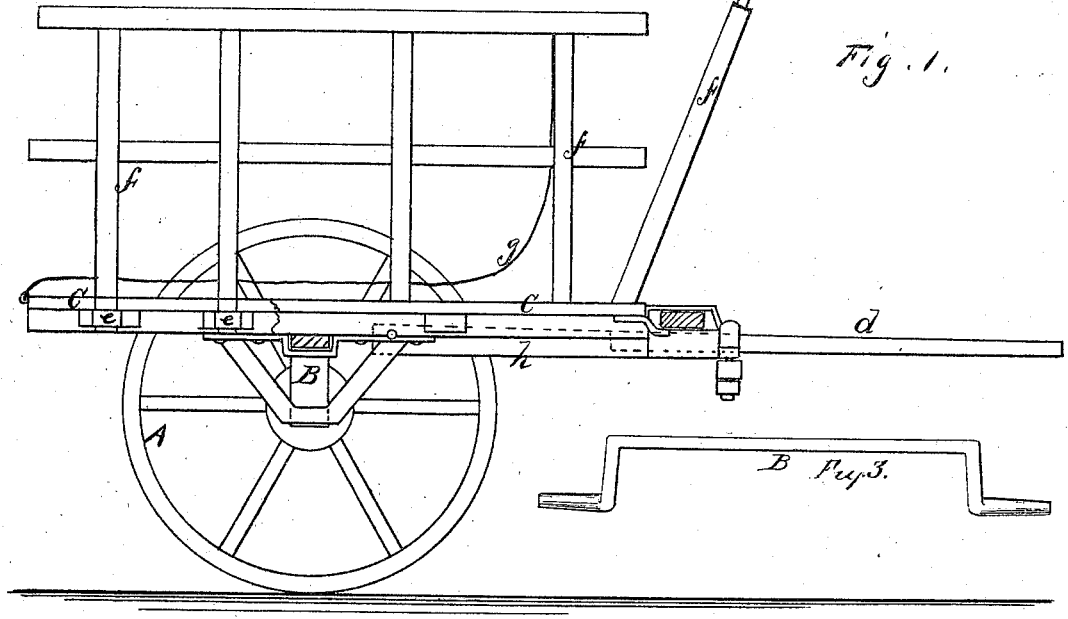
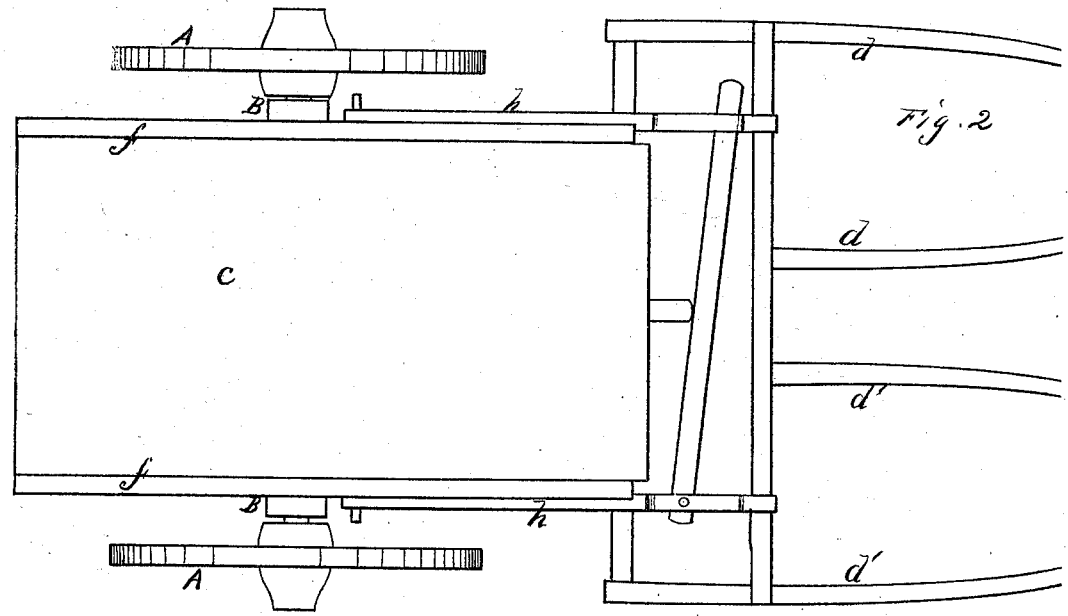

GEORGE ZOANNY, OF NAPA, CALIFORNIA.

IMPROVEMENT IN DUMPING-CARTS.

Specifications forming part of Letters Patent No. 133,615, dated December 3, 1872.

*To all whom it may concern:*

Be it known that I, GEORGE ZOANNY, of Napa, county of Napa, State of California, have invented a Vine-Grower's Combination Cart; and I do hereby declare the following description and accompanying drawing are sufficient to enable any person skilled in the art or science to which it most nearly appertains to make and use my said invention without further invention or experiment.

My invention relates to a cart which is particularly useful for vine growers on account of the numerous uses to which it can be put and its adaptability for working among growing vines.

In order to more fully illustrate and explain my improvements reference is had to the accompanying drawing forming a part of this specification, in which—

Figure 1 is a side elevation; Fig. 2 is a top view; and Fig. 3 is a detached view of the axle.

A A represent the two wheels of a cart, which are united by an axle, B, which is cranked at both ends. The floor C of the cart is secured to the axle by means of removable bolts, so that the position of the axle can be readily reversed to cause the bottom of the cart to be carried above or below the center of the wheels, as desired. In order to carry the bottom of the cart above the center of the wheels the axle is turned so as to cause the cranks to depend from the ends of the bar which connects them, and the bottom or floor is secured to it in this position. This adjustment is necessary when it is desired to pass over a row of vines with the cart, by allowing one wheel to pass on each side of the row, and the height of the floor will usually be sufficient to clear the vines. This arrangement will be very convenient in trimming the vines, as the cuttings can be placed directly in the cart without trouble. By removing the fastenings which secure the floor to the axle, the axle can be allowed to turn until the connecting-bar is below the center of the wheels, and thus convert the cart into a dray for hauling manure, boxes of fruit, or other heavy loads. For drawing the cart, when it is in position for moving over the row of vines, I employ two horses, and to permit them to walk outside of the row of vines I construct a double pair of shafts so that the pair $d\,d$ are separated from the pair $d'\,d'$ far enough to clear the row of vines and allow the horses to walk upon each side of the row. These shafts can be removed at pleasure and a single pair substituted for them when the cart is to be converted into a dray. On the side timbers of the frame of the floor I secure sockets $e$, in which I secure the side and end boards of the cart. For carrying vines I employ skeleton side and end boards or racks $f$, which are held in place by securing the lower ends of the standards in the sockets $e$. Before loading this rack with vines I secure a cord, $g$, to the rear end of the cart and carry it forward along the bottom or floor to the forward end, where I allow it to remain, and when the vines are trimmed I throw the cut vines loosely into the rack upon the cord. When the rack has been filled the cart is drawn to the place where it is desired to dump the vines. The cord $g$ is then carried to the rear of the cart above the vines, and the horses started, while the end of the cord is held steadily. This draws the vines out at the rear of the cart. The shafts $d\,d$ and $d'\,d'$ have a rod, $h$, extending back upon each side of the floor, which is secured by a rod to the timbers of the bottom, so that they form a pivot about which the cart can revolve in dumping the load.

This cart is especially useful to vine-growers on account of the facility which it provides for clearing away the vine-cuttings and its general adaptability for work on a farm.

Having thus described my invention, what I claim, and desire to secure by Letters Patent, is—

A vine-grower's combination cart, consisting of the cranked axle B with its wheels A, detachable bottom or floor $c$, double pairs of shafts $d\,d$ and $d'\,d'$, separated as described, all constructed and arranged substantially as above described.

In witness whereof I hereunto set my hand and seal.

GEORGE ZOANNY. [L. S.]

Witnesses:
GOTTHELF BARTH,
T. E. ELLER.